(12) United States Patent
Light et al.

(10) Patent No.: US 6,349,136 B1
(45) Date of Patent: Feb. 19, 2002

(54) SYSTEM AND METHOD FOR CONTROLLING A CONFERENCE CALL

(75) Inventors: Jeffrey Ross Light, Lincolnwood; Alex Lawrence Wierzbicki, Bolingbrook; Randall Joe Wilson, Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/359,784

(22) Filed: Jul. 23, 1999

(51) Int. Cl.[7] .................................. H04M 3/42
(52) U.S. Cl. ..................... 379/202.01; 379/203.01; 379/204.01; 379/206.01
(58) Field of Search .............. 379/202.01, 203.01, 379/204.01, 205.01, 206.01

(56) References Cited

U.S. PATENT DOCUMENTS 3,912,874 A * 10/1975 Botterell et al. ............ 379/201
5,844,979 A * 12/1998 Raniere et al. ............. 379/202
6,178,237 B1 * 1/2001 Horn ........................... 379/202

* cited by examiner

Primary Examiner—Ahmad Matar
Assistant Examiner—Hector Agdeppa
(74) Attorney, Agent, or Firm—Michael B. Johannesen

(57) ABSTRACT

A system and method that provides control of a conference call. A controlling party enters a code and is isolated from the conference. Each conference participant is sequentially connected to the controlling party so that the controlling party may determine the noise level on that leg of the call. If there is no excess noise, then the controlling party may enter a code which causes the switch to select the next party on the conference call. When the controlling party discerns the offending conference participant, the controlling party can signal the switch to drop the offending party. The controlling party may then rejoin all of the conference participants.

10 Claims, 2 Drawing Sheets

SYSTEM AND METHOD FOR CONTROLLING A CONFERENCE CALL

TECHNICAL FIELD

This invention relates to the field of telephone features, and, more specifically, to a new feature for controlling conference calls.

BACKGROUND OF THE INVENTION

Any participant on a conference call can place his or her telephone on hold. If a "music-on-hold" feature is assigned to that participant's line, music is played back to the far end party. In this case, however, the far end party is all of the other participants on the conference call. The injected music disrupts the conference call and there is no way for the remaining participants to identify or isolate who initiated the hold. Furthermore, one (or more) of the participants may have a high level of background noise or a noisy link and not be aware of it. Therefore, there is a need in the art for a method to drop a conference participant who is disrupting a conference call.

SUMMARY OF THE INVENTION

This problem is solved and a technical advance is achieved in the art by a system and method that provides a participant on a conference call with the ability to determine which party is injecting the noise into the call and to cause the switching system to drop the selected participant from the conference call. Advantageously, one of the conference call participants is the controlling participant. Alternatively, any member of the conference that can control a conference circuit (e.g., is using a touch-tone telephone) may be the controlling party.

A method according to this invention provides control of a conference call in an established conference call, wherein a controlling party enters a code. The controlling party is then isolated from the conference. Each conference participant is sequentially connected to the controlling party so that the controlling party may determine the noise level on that leg of the call. If there is no excess noise, then the controlling party may enter a code which causes the switch to select the next party on the conference call. When the controlling party discerns the offending conference participant with the noisy connection, the controlling party can signal the switch to drop the offending party. The controlling party may then rejoin all of the conference participants.

DETAILED DESCRIPTION

Figure 1:
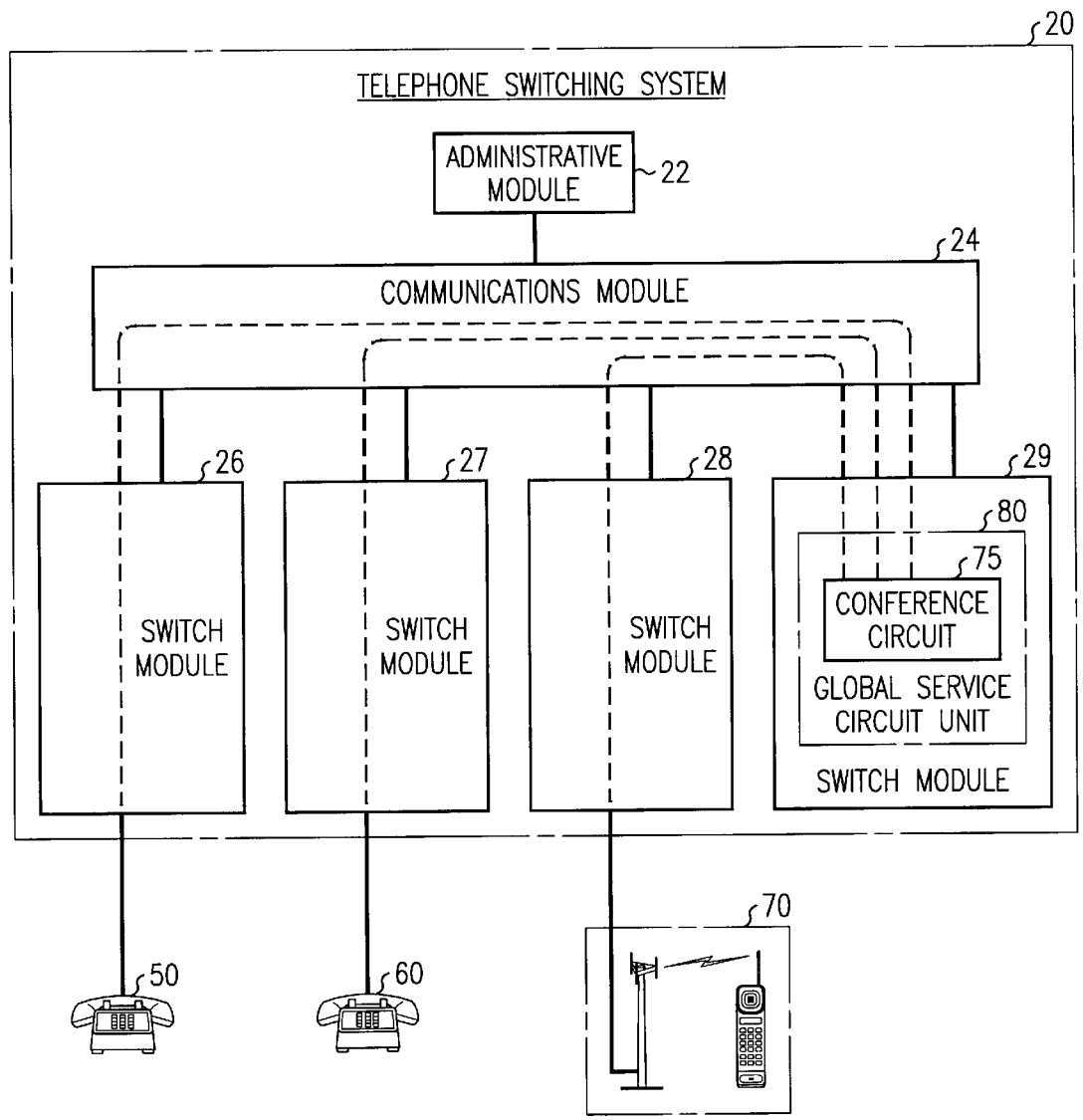
FIG. 1 is a block diagram of a telephone system in which an exemplary embodiment of this invention may be implemented.

This invention will be described in the context of the telephone system 10. Telephone system 10 comprises a telephone switching system, or "switch" 20. Switch 20 is the same or similar to a 5ESS® switch manufactured by Lucent Technologies. Switch 20 comprises an administrative module 22, a communication module 24, and a plurality of switching modules represented by switching modules 26, 27, 28, and 29. In a typical 5ESS switch installation, there are usually more switching modules. Administrative module 22 provides coordination of the functional components of switch 20 and human machine interface.

Administrative module 22 is connected to communications module 24, which acts as a hub among switching modules 26–29 and administrative module 22. Each switching module 26–29 terminates subscriber lines and trunks, as is known in the art. For purposes of this exemplary embodiment, switching module 26 is connected to telephone 50 switching module 27 is connected to telephone 60, and switching module 28 is connected to a wireless communication system supporting wireless telephone 70. Switching module 29 includes conference circuit 75 in a global service circuit unit 80.

According to an exemplary embodiment of this invention, telephones 50, 60, and 70 are engaged in a three-way conference call connected through conference circuit 75, as is known in the art. For purposes of this exemplary embodiment, participant 70 has a noisy wireless connection. However, none of the conference participants know exactly which member of the conference has the noisy connection. Therefore, according to this invention, the user of telephone 50 (the controlling party) presses the switchhook to initiate control of the conference call. Telephone 50 is then isolated from the conference, and dial-tone (or some other prompt) is applied to telephone 50. The user of telephone 50 enters a code, such as *XX code via dual-tone, multifrequency digits (DTMF), to activate this feature according to this exemplary embodiment. Switch module 29 recognizes the code and causes telephone 50 to be connected to each one of the participants in turn. In this case, the controller at telephone 50 may first be connected to telephone 60. The controller then listens on the line for noise or interference (or music on hold). If there is none, then the controller enters another code to advance to the next leg of the conference call.

In this case, the controller at telephone 50 presses "1" and is advanced to the connection with telephone 70. In this example, the controller at telephone 50 hears interference and/or noise on the line on the connection to telephone 70 and enters a drop code, for example "2". Switch module 26 then drops the leg of the call through switch module 28 to telephone 70. Controller 50 then either advances to another leg of the call (in X way calling), or presses the switchhook again to rejoin the conference. The dropped party may then call in to reestablish a connection with the conference, or, alternatively, one of the members of the conference (for example, the controller at telephone 50) may re-add telephone 70 by the normal conference procedure.

Figure 2:
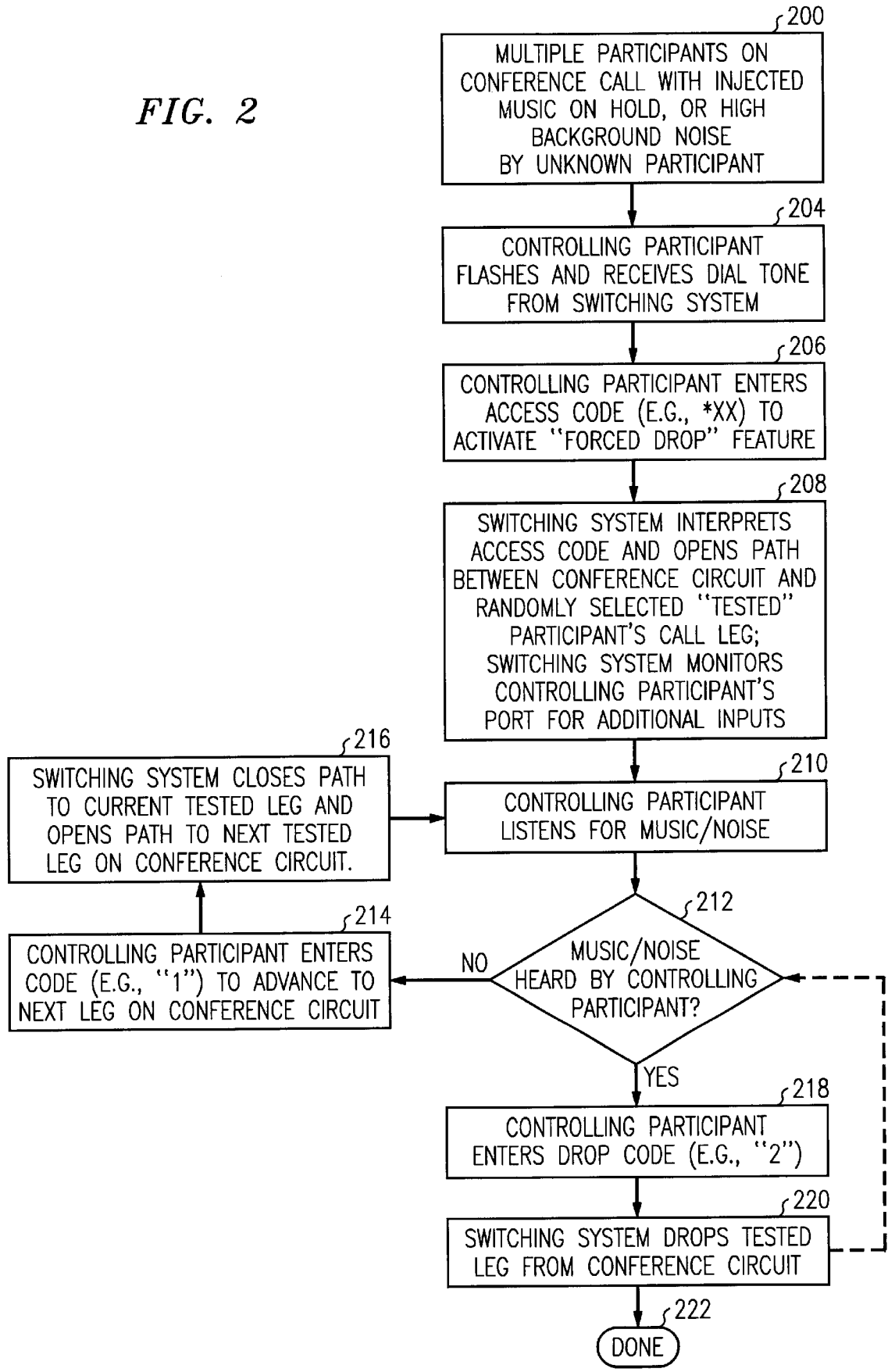
FIG. 2 is a flow chart of processing according to a method of this invention.

Turning now to FIG. 2, a flow chart of processing according to this invention is shown. In box 200, multiple participants are on a conference call and there is injected into this conference call music on hold or high background noise by one or more participants. Processing moves to box 204, where the controlling participant flashes the switchhook, is isolated from the rest of the conference and receives dialtone from the switching system. Processing continues to box 206, where the controlling participant enters a code using, for example, dual-tone multifrequency digits (DTMF), as is known in the art, to activate the forced drop feature. In action box 208, the switching system interprets the access code and connects the conference circuit and a selected tested participant's call leg. The switching system monitors the controlling participant's port for additional input via DTMF or other signaling. Processing moves to action box 210 where the controlling participant listens for music or noise. In decision diamond 212, the participant decides whether there is noise or music on this particular leg of the call. If there is not, processing moves to action box 214 where the controlling participant enters a code, for example 1, to advance to the next leg on the conference circuit. Processing moves to box 216, where the switching system closes the path to the current tested leg again, opens the path to the next tested leg on the conference circuit.

If, in decision diamond 212, music/noise is heard by the controlling participant, then processing moves to action box 218 where the controlling participant enters a drop code (for example, 2). Processing moves to action box 220 where the switching system drops the tested leg from the conference circuit. At this point, the switching system may advance to the next leg on the conference circuit or may finish in circle 222.

It is to be understood that the above-described embodiment is merely an illustrative principle of the invention and that many variations may be devised by those skilled in the art without departing from the scope of the invention. It is, therefore, intended that such variations be included within the scope of the claims.

What is claimed is:

1. A method for use in a telecommunications system for controlling a conference call in a conference circuit in order to determine a source of noise in said conference call, said conference call comprising a plurality of legs, each of said legs supporting one participant in the conference call, said method comprising the steps of:

isolating all of the legs of the conference call in the conference circuit from a controlling leg;

connecting one of said legs of said conference call to the controlling leg through the conference circuit;

determining whether said one of said legs is the source of noise;

dropping said one of said legs if said one of said legs is the source of said noise; and rejoining all of the legs of the conference call.

2. A method in accordance with claim 1 wherein the step of isolating all of the legs of the conference call comprises receiving a code from the controlling leg.

3. A method in accordance with claim 2 wherein receiving the code comprises flashing the switchhook and entering one or more dual-tone, multifrequency digits.

4. A method in accordance with claim 1 further including the steps of:

isolating said one of said legs of said conference call and connecting another one of said legs to the controlling leg through the conference circuit if said one of said legs is not the source of noise.

5. A method in accordance with claim 4 wherein the steps of disconnecting, connecting and determining are performed until the leg with the source of the noise is dropped.

6. A telecommunications system for controlling a conference call, said conference call comprising a plurality of participants each having a connection to a conference circuit, each of the connections comprising a leg of the conference call through the conference circuit, said telecommunications system comprising:

a conference circuit connecting all of the legs of the conference call;

means for isolating all of the legs of the conference call from a controlling leg;

means for serially connecting each of said legs of said conference call through the conference circuit to the controlling leg;

means for dropping said one of said legs if said one of said legs is noisy; and means for rejoining all of the remaining legs of the conference call.

7. A telecommunications system according to claim 6 wherein said means for isolating and said means for rejoining are responsive to a switchhook signal from the controlling leg.

8. A telecommunications system according to claim 6 wherein said means for connecting and means for dropping are responsive to dual tone, multifrequency signals from the controlling leg.

9. A telecommunications system according to claim 6 wherein said telecommunications system comprises a switching system connected to said conference participants.

10. A telecommunications system according to claim 6 wherein said telecommunications system comprises a plurality of switching systems, each of said switching systems being connected to at least one conference participant.

\* \* \* \* \*